(12) United States Patent
Kohler et al.

(10) Patent No.: US 9,211,982 B2
(45) Date of Patent: Dec. 15, 2015

(54) CLOSURE DEVICE AND CORRESPONDING CONTAINER

(76) Inventors: Claudia Kohler, Birkenwerder (DE); Irmy Wilms-Haverkamp, Herford (DE); Cornelius Boerner, Kuchen (DE)

( * ) Notice: Subject to any disclaimer, the term of this patent is extended or adjusted under 35 U.S.C. 154(b) by 0 days.

(21) Appl. No.: 14/125,671

(22) PCT Filed: Jun. 25, 2012

(86) PCT No.: PCT/EP2012/062216
§ 371 (c)(1),
(2), (4) Date: Feb. 19, 2014

(87) PCT Pub. No.: WO2013/000858
PCT Pub. Date: Jan. 3, 2013

(65) Prior Publication Data
US 2014/0151390 A1   Jun. 5, 2014

(30) Foreign Application Priority Data

Jun. 30, 2011   (DE) .................. 10 2011 078 465

(51) Int. Cl.
| | | |
|---|---|---|
| A47G 19/22 | (2006.01) | |
| B65D 51/10 | (2006.01) | |
| B65D 43/18 | (2006.01) | |
| A47G 19/12 | (2006.01) | |
| F16K 17/36 | (2006.01) | |

(52) U.S. Cl.
CPC .............. B65D 43/18 (2013.01); A47G 19/12 (2013.01); A47G 19/22 (2013.01); B65D 51/10 (2013.01); F16K 17/36 (2013.01); F16K 17/363 (2013.01)

(58) Field of Classification Search
CPC ....... A47G 19/12; A47G 19/22; B65D 43/18; B65D 51/10; F16K 17/36; F16K 17/363
USPC .............. 220/825, 828, 719, 254.3, 203.19, 220/203.2, 703, 827; 215/21, 23, 24, 312, 215/313; 222/556, 547, 563, 544
See application file for complete search history.

(56) References Cited

U.S. PATENT DOCUMENTS

| 789,638 | A | * | 5/1905 | Sommerville | .............. 215/23 |
| 2,007,049 | A | * | 7/1935 | Hellmann | .............. 222/450 |
| 2009/0108003 | A1 | * | 4/2009 | Tripsianes | .............. 220/521 |

FOREIGN PATENT DOCUMENTS

| CN | 201806566 U | 4/2011 |
| CN | 201280027063.5 | 4/2011 |

(Continued)

*Primary Examiner* — Fenn Mathew
*Assistant Examiner* — James N Smalley
(74) *Attorney, Agent, or Firm* — James R. Klaiber; Pryor Cashman LLP

(57) ABSTRACT

A closure device for a container, and preferably for a water decanter, comprising a frame comprising a closure opening and which is preferably round and configured for insertion into a pouring opening of the container, a lid, which is connected to a pendulum and which is suspended in the closure opening of the frame, and configured to swing therein, wherein the lid is configured to close and seal the closure opening when the container is substantially upright, and wherein the lid and pendulum are configured to rotate with respect to the closure opening when the container is held in a slanted or horizontal manner. The closure device preferably comprises at least one cantilever arm secured to an inner wall of the frame at a first end and connected to the lid at a second end so that the lid is configured to swing with respect to the closure opening.

12 Claims, 1 Drawing Sheet

(56) References Cited

FOREIGN PATENT DOCUMENTS

| FR | 1329700 | * | 4/1962 |
| FR | 1329700 A | | 6/1963 |
| WO | 2009112552 A1 | | 9/2009 |
| WO | WO 2009112552 A1 | * | 9/2009 |

* cited by examiner

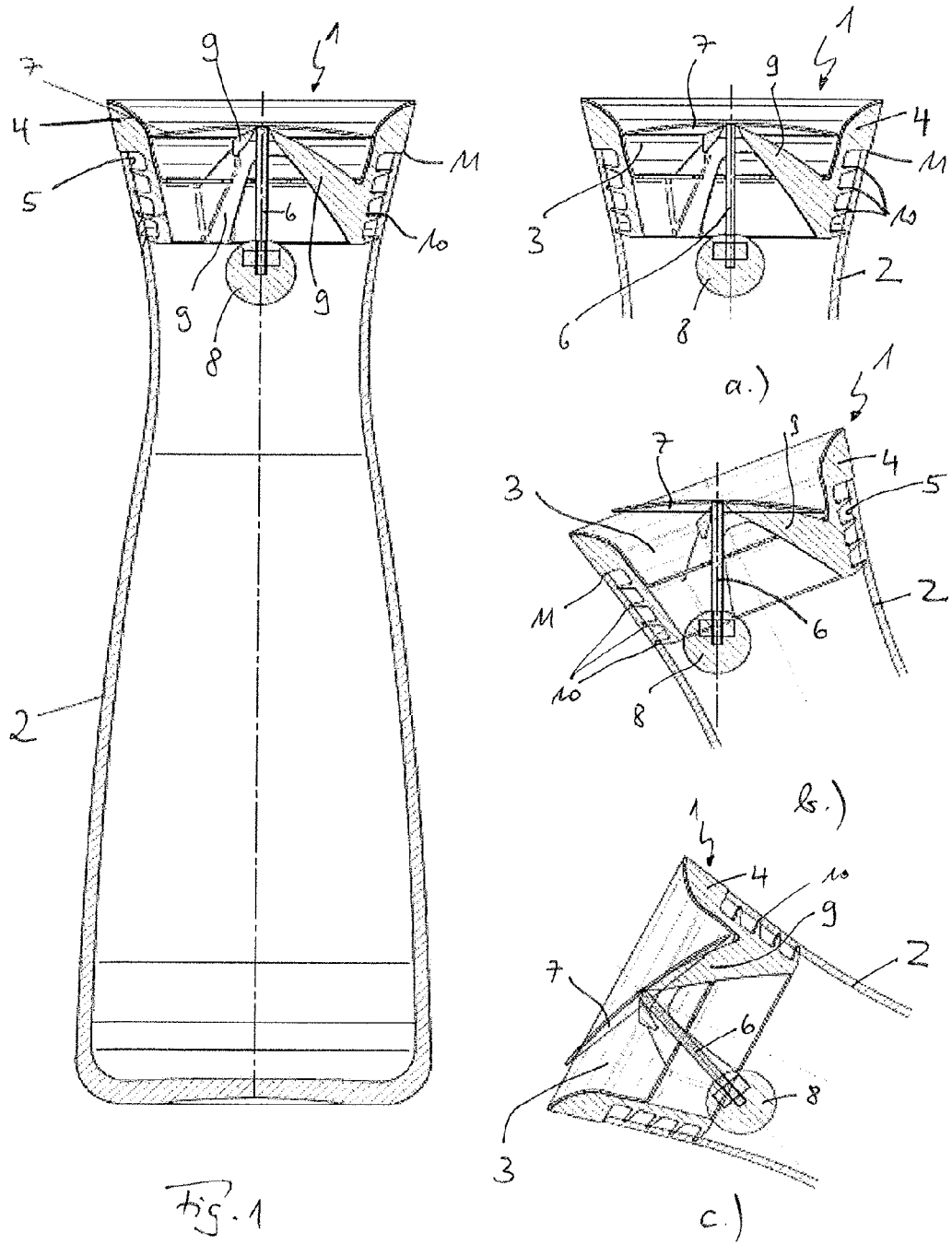

CLOSURE DEVICE AND CORRESPONDING CONTAINER

RELATED APPLICATIONS

The present application is a U.S. national phase application under 35 USC §371 which claims priority to prior filed International Application No. PCT/EP2012/062216, filed Jun. 25, 2012, which itself claims priority to German Application No. 102011078465.9, filed Jun. 30, 2011. All description, drawings and teachings set forth therein are expressly incorporated by reference herein.

SUMMARY

The present invention comprises a closure device for a container, and preferably for a water decanter, comprising a frame comprising a closure opening and which is preferably round and configured for insertion into a pouring opening of the container, a lid, which is connected to a pendulum and which is suspended in the closure opening of the frame, and configured to swing therein, wherein the lid is configured to close and seal the closure opening when the container is substantially upright, and wherein the lid and pendulum are configured to rotate with respect to the closure opening when the container is held in a slanted or horizontal manner. The closure device preferably comprises at least one cantilever arm secured to an inner wall of the frame at a first end and connected to the lid at a second end so that the lid is configured to swing with respect to the closure opening.

BRIEF DESCRIPTION OF THE DRAWINGS

FIG. 1 is a front elevational view of the present invention, a closure device for a container, showing the closure device as would be placed within a container such as a water decanter;

FIG. 2(a) is a close-up front elevational view of the present invention as seen in FIG. 1, showing the lid and pendulum of the closure device when the device is at a substantially upright position;

FIG. 2(b) is a front elevational view of the present invention showing the lid and pendulum rotating with respect to the closure opening when the device is slightly slanted; and FIG. 2(c) is a front elevational view of the present invention showing the lid and pendulum rotating further with respect to the closure opening when the device is at an almost-horizontal position.

DETAILED DESCRIPTION OF THE DRAWINGS

Description will now be given of the invention with reference to the attached FIGS. 1-2(c). It should be understood that these figures are exemplary in nature and in no way serve to limit the scope of the invention as the invention will be defined by the claims, as interpreted by the Courts in an issued US Patent.

The instant invention relates to a closure device of a container, in particular for a water decanter. The invention furthermore relates to a container, in particular a water decanter, comprising such a closure device.

To be able to meet high esthetic demands in particular in the commercial sector but increasingly also in the private sector, water is not set down on the table in the commercially available bottles, but is typically decanted into a water decanter ahead of time. To be able to avoid undesired contaminations of the water, which is offered in this manner, the water decanters typically have a closure device, which must be opened prior to pouring and which must be closed again after pouring. On principle, this is somewhat complex, whereby this is aggravated by the fact that the reclosing of the water decanter is often omitted due to this complexity and that undesired contamination can thus get into the drinking water in spite of everything.

The invention thus deals with the problem of specifying a closure device for containers, in particular for water decanters, which opens or closes, respectively, a closure opening automatically and thus without additional hand movements.

This problem is solved according to the invention by means of the subject matters of the independent claims. Advantageous embodiments are the subject matter of the dependent claims.

The instant invention is based on the general idea of specifying a self-sufficient closure device, which, if needed, can be inserted into matching pouring openings of containers, for example of water decanters, and which encompasses a lid, which is suspended so as to be able to be able to swing, which closes a closure opening of the closure device when the container stands upright, and which is rotated due to the weight of the pendulum, when the container is held in a slanted or horizontal manner, and the closure opening of the closure device and thus also the pouring opening of the container opens through this. A lid, which is suspended so as to be able to swing in this manner, represents a considerable simplification for being used, because the container, that is, the water decanter, for example, is closed reliably in the normal state, standing upright on the table, whereas a pouring opening of the container is opened automatically in response to pouring and pouring can thus take place quickly. When setting down the container, the lid, which is suspended so as to be able to swing, has the effect that the closure opening of the closure device and thus the pouring opening of the container, are closed reliably again. The lid, the pendulum and a corresponding frame, which is round in particular and which forms the closure opening the closure device, for insertion into the pouring opening of the container, thereby preferably form a connected assembly group, so that the closure device, which consists thereof, is simply attached to a respective container for use and, after emptying the container, can be removed from the latter again and can be reused or cleaned, respectively. It is furthermore a particular advantage of the closure device according to the invention that the opening and closing of the closure opening and thus also of the pouring opening of the container does not require any additional manual activities, but takes place simply due to the weight shifting of the pendulum when moving the container. In the event that the container is thus tilted, a rotation and thus an opening of the lid takes place due to the weight, which is arranged at the pendulum, whereas the pendulum swings back when setting down the container back into a preferably upright position and thereby shifts the lid back into its closed position.

In the case of an advantageous further development of the solution according to the invention, a weight is arranged at the free end of the pendulum. Depending on the embodiment of the lid, an individual weight can be involved for reliably opening or closing, respectively, said lid, wherein a larger weight causes a reliable opening and closing of the lid at the same time.

In the case of an advantageous further development of the solution according to the invention, provision is made for three cantilever arms, which stick out from an inner wall of the frame and which touch one another at their free ends, wherein the lid is suspended in the area of the free ends of the arms, which touch one another, so as to be able to swing. The lid is thereby suspended so as to be able to swing such that it can be moved freely in all directions, so that a direction-independent pouring and thus also a direction-independent opening or closing, respectively, of the lid can take place solely via the force of the pendulum. This offers a further significant advantage as compared to current water decanters, the closures of which have often closed a spout, which, in turn, only allows for a single pouring direction of the liquid from the water decanter, that is, from the container.

Advantageously, sealing lips, which come to rest against an inner wall of the container when the closure device is inserted into the pouring opening of the container, are arranged at an outer wall of the frame. These sealing lips thereby do not only cause a sealing of the pouring opening, but additionally also a reliable fixation of the closure device in the pouring opening of the container, wherein the sealing lips can additionally compensate small production tolerances in the case of the containers. In the event that the sealing lips are embodied so as to be comparatively large and elastic, the closure device itself cannot be inserted tightly and firmly into pouring openings, which are not embodied so as to be exactly complementary thereto, at different containers.

Further important features and advantages of the invention follow from the subclaims, from the drawings and from the corresponding figure description by means of the drawings.

It goes without saying that the above-mentioned features and the features, which will still be explained below, cannot only be used in the respective specified combination, but also in other combinations or alone, without leaving the scope of the instant invention.

Preferred exemplary embodiments of the invention are illustrated in the drawings and will be explained in more detail in the description below, wherein the same reference numerals refer to the same components or to components, which are similar or which have the same function.

In each case schematically

FIG. 1 shows a container in the form of a water decanter comprising a closure device according to the invention, FIG. 2a shows the closure device when the lid is closed, FIG. 2b shows the closure device when the container is tilted and the lid is thus open, FIG. 2c shows the closure device when the container is further tilted and the closure device is open completely.

According to FIGS. 1 to 3, a closure device 1 according to the invention for a container 2, which is embodied as water decanter, for example, encompasses a frame 4, which forms a closure opening 3 and which is in particular round, for insertion into a pouring opening 5 of the container 2. In addition, the closure device 1 has a lid 7, which is connected to a pendulum 6 and which is suspended in the closure opening 3 of the frame 4 so as to be able to swing such that the lid 7 closes the closure opening 3 when the container 2 is substantially upright, whereas the lid 7 rotates due to the weight of the pendulum 6, when the container 2 is held in a slanted or horizontal manner and the closure opening 3 is opened through this. The closure device 1 thus offers the significant advantage that a tilt-independent opening and closing of the closure opening 3 and thus also of the pouring opening 5 of the container 2 takes place, without further activities being required to do so. A tilting of the container 2 and thus also a tilting of the closure device 1, which is arranged therein, already causes an opening of the lid 7 and thus an opening of the closure opening 3 due to the weight of the pendulum 6, whereas the latter is closed again, provided that the container 2 is pivoted back into its substantially upright position again.

When looking at the lid 7 according to FIGS. 1 and 2, it can be seen that it encompasses a partially spherical shape, whereby it goes without saying that all other shapes, in particular a flat shape, is also possible. The pendulum 6 sticks out from the lid 7 substantially orthogonally thereto and can encompass a weight 8 at a free end. In the event that the pendulum 6 itself is so heavy that it is sufficient for an opening and closing movement, the weight 8 can on principle also be foregone. When further considering FIG. 1, it can be seen that provision is made for a total of three cantilever arms 9, which stick out from an inner wall of the frame 4 and which touch one another at their free ends, wherein the lid 7 is suspended in the area of the free ends of the cantilever arms 9, which touch one another, so as to be able to swing. It goes without saying that a single cantilever arm 9 is also sufficient for this. The suspension so as to be able to swing is thereby designed such that the pendulum 6 can deflect in a direction-independent manner and that a direction-independent opening and closing of the lid 7 can thus take place, depending on the tilt direction of the closure device 1 or of the container 2, respectively. This is particularly advantageous in the case of water decanters without an additional handle. In the completely open state, as it is illustrated according to FIGS. 2b and 2c, for example, at least one of the cantilever arms 9 at the same time forms a stop for the lid 7, which prevents, that is, limits, a further opening movement.

Sealing lips 10, which come to rest against an inner wall of the container 2 when the closure device 1 is inserted into the pouring opening 5 of the container 2 and which thereby seal of the closure device 1 relative to the container 2 on the one hand and which additionally fix the closure device 1 in the pouring opening 5 of the container 2, are arranged at an outer wall of the frame 4. The frame 4 can thereby additionally encompass a collar 11, which is arranged above the sealing lips 10 and which is oriented radially outwards and which serves as insertion stop and thus limits the insertion movement of the closure device 1 into the pouring opening 5 of the container 2.

On principle, the frame 4, the at least one cantilever arm 9, the lid 7, and/or the pendulum 6 can be made of metal or of plastic or of a mixture thereof.

The different open and closed states of the closure device 1 are shown according to FIGS. 2a to 2c, wherein, according to FIG. 2a, the container 2 is upright and the lid 7 is thus in its closed position. According to FIG. 2b, the container 2 and thus also the closure device 1 is illustrated in the tilted state, in which the weight 8 causes a pivoting of the pendulum 6 and thus also a pivoting and opening of the lid 7. The lid 7 thereby rests against an upper side of the cantilever arm 9, so that a further opening movement is no longer possible. According to FIG. 2c, the container 2 and thus also the closure device 1 are tilted even further, wherein the lid 7 encompasses the same open position as in FIG. 2b, because the cantilever arm 9, which forms the stop, prevents the further opening movement of the lid 7. An abutting of the weight 8 of the pendulum 6 against an inner wall of the frame 4 could also prevent a further opening movement in the same way. When the container 2 and thus also the closure device 1 is tilted back, the lid is shifted back into its closed position again (see FIG. 2a) due to the force of gravity by the pendulum 6 and the weight 8, which is fastened thereto.

On the one hand, a reliable closing of the pouring opening 5 of the container 2 in the non-use state can be reached by means of the closure device 1 according to the invention, which can on principle be reused and which can be inserted into diverse pouring openings 5 at containers 2 and, on the other hand, an automatic opening of the pouring opening can be reached when tilting the container, that is, in response to a normal pouring. Due to the embodiment of the closure device 1, which has a simple design, a tilting and, at the same time, an opening of the lid 7 into any direction is also possible, whereby the closure device 1 according to the invention, in turn, differs considerably from the state of the art. In addition, the closure device 1 according to the invention has a simple design and can be produced in a cost-efficient manner, which provides in particular a large advantage with reference to marketing.

The invention claimed is:

1. A closure device of a container, in particular for a water decanter, comprising:
   a frame, comprising a closure opening configured for insertion into a pouring opening of the container;
   a lid, connected to a pendulum and suspended in said closure opening of said frame, and configured to swing therein;
      wherein said lid is configured to close and seal said closure opening when the container is substantially upright;
      wherein said lid and said pendulum are configured to rotate with respect to said closure opening when the container is held in a slanted or horizontal manner;
   a plurality of cantilever arms, each secured to and sticking out from an inner wall of said frame at a first end of said arms and connected to said lid at a second end of said arms so that said lid is configured to be suspended from said second ends of said arms and swing with respect to said closure opening;
      wherein said cantilever arms touch one another at their second ends; and
      wherein said plurality of cantilever arms is configured such that when said lid swings in respect to said closure opening, said lid rests against an upper side of the cantilever arms to stop said lid to limit an opening movement of said lid.

2. The closure device according to claim 1, wherein said lid includes a partially spherical shape.

3. The closure device according to claim 1, wherein said pendulum sticks out from the lid substantially orthogonally.

4. The closure device according to claim 1, further comprising a weight arranged at the free end of said pendulum.

5. The closure device according to claim 1, further comprising sealing lips, configured to rest against an inner wall of the container when said closure device is inserted into said pouring opening of the container.

6. The closure device according to claim 1, wherein at least one of said lid and said pendulum are made of metal.

7. The closure device according to claim 1, wherein said closure device is configured for use in a water decanter.

8. The closure device according to claim 1 wherein said frame is round.

9. The closure device according to claim 1 wherein said plurality of cantilever arms comprises three cantilever arms.

10. The closure device according to claim 1 wherein at least one of said lid and said pendulum are made of plastic.

11. The closure device according to claim 1 wherein said plurality of cantilever arms is made of metal.

12. The closure device according to claim 1 wherein said plurality of cantilever arms is made of plastic.

* * * * *